Nov. 7, 1961   R. A. CUNNINGHAM   3,007,750
LUBRICATING SYSTEM
Filed June 16, 1958
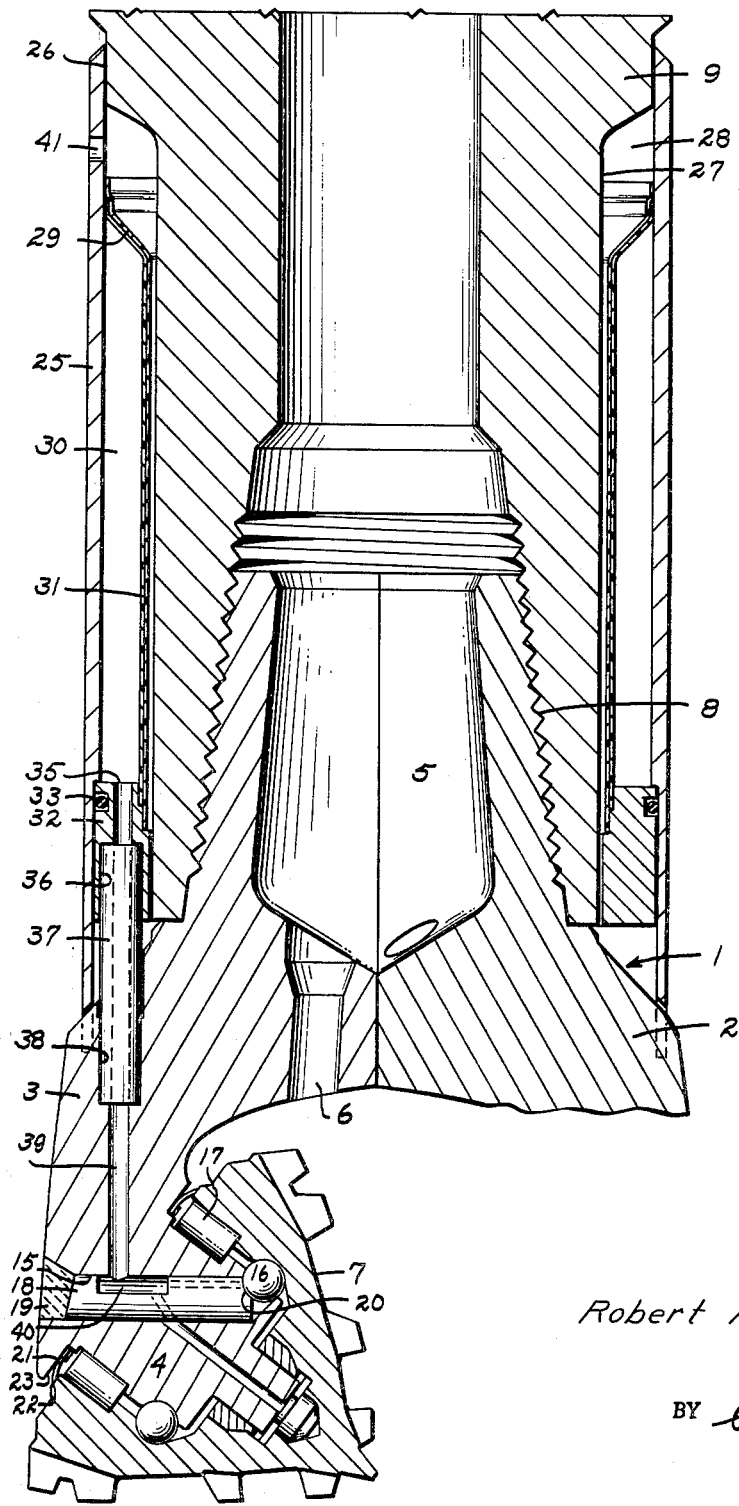
Robert A. Cunningham
INVENTOR.
BY *Ray L. Smith*
ATTORNEY United States Patent Office 3,007,750
Patented Nov. 7, 1961

3,007,750
LUBRICATING SYSTEM
Robert A. Cunningham, Bellaire, Tex., assignor to Hughes Tool Company, Houston, Tex., a corporation of Delaware
Filed June 16, 1958, Ser. No. 742,277
5 Claims. (Cl. 308—187)

This invention relates to the lubrication of relatively rotatable parts and is of particular utility in maintaining thorough lubrication of parts where there is a combination of relative axial, radial and wobbling movement between the parts.

The invention is of particular utility in earth boring drills of the rolling cutter type, and is described herein as embodied in such a structure. However, it is to be understood that the invention is not confined to such specific structure, but is of utility in any environment wherein advantage may be obtained from its superiority in maintaining adequate lubrication of relatively rotatable parts. In earth boring drills, conditions are extremely severe because such drills operate in an ambient of abrasive fluid wherein there is possibility not only of loss of lubricant but a replacement, in quantity for such loss, of an abrasive fluid which contaminates the remaining lubricant and renders the bearing fluid of a destructive nature rather than a body of protective lubricant.

The primary object of the invention is to provide a lubrication system that will assure the presence of adequate, uncontaminated lubricant in a bearing at all times.

Another object is to provide a sealed bearing assembly including a complement of lubricant so that replacement of lost lubricant may be effected and compensation is made for any volumetric change within the bearing during relative movements between parts thereof.

Still another object is to provide a sealed bearing assembly including a lubricant chamber and means for maintaining in the bearings at all times the proper volume of lubricant, even though relative large and rapidly changing volumetric changes take place within the bearing.

A still further object is to provide a bearing assembly with a bearing seal and a lubricant chamber containing a quantity of lubricant communicating with the bearing, at least one wall of said lubricant chamber being formed of an impervious and flexible material, said wall and said seal being subjected to the pressure of the ambient whereby free movement of the lubricant compensates for volumetric changes within the bearing.

These and other objects will be apparent from the following description and the accompanying drawing which shows an embodiment of the invention incorporated in an earth boring drill.

The bit 1 comprises a bit head 2 having downwardly extending legs, one of which is shown at 3. Each leg has an integral shaft 4 which extends inwardly and downwardly toward the axis of the bit. The head 2 has an internal chamber 5 through which flushing fluid is conducted downwardly through passageways 6 to and about the cutters, one of which is shown at 7. The upper end of the bit head is threadedly attached at 8 to a section of drill stem 9 by means of which the bit 1 is rotated to accomplish its intended purpose.

A bore 15 extends from the exterior of the leg 3 to a point in the ball race for the ball bearings 16. The structure thus enables positioning of the cutter 7 upon the shaft 4 with the rollers 17 in place. The balls 16 are inserted through the bore 15 until the ball raceway is filled. A pin 18 is then inserted in the bore 15 and secured in place by means of weld metal 19. It is noted that the inner end of the pin 18 is contoured at 20 to complete the ball race where the bore 15 enters the ball race.

An annular frusto conical seal ring 21 forms a seal between the surface 22 at the base of the cutter 7 and the shoulder 23 at the base of the shaft 4. There is thus provided a sealed bearing in which it is desired to keep an adequate supply of lubricant, and from which contaminants are to be excluded. This requires that pressures on opposite sides of the seal ring be substantially balanced at all times, that flushing fluids exteriorly of the bearing be prevented from entering the bearing and that compensation be made for any lubricant leaking past the seal ring.

To accomplish this I provide a housing 25 which rests upon the head 2 of the bit 1 and has its upper end slidingly surrounding the end of the drill stem section 9 as indicated at 26. This drill stem section is reduced at 27 whereby an annulus 28 is provided between the housing 25 and the lower end of the drill stem section 9.

A partition is formed within the annulus 28 by a perforated sleeve 29 secured to the inner wall of the housing 25 and extending inwardly and downwardly to form a lubricant chamber 30. The inner wall of this chamber is an annular sheath 31 of impervious and flexible material, such as rubber or plastic, which is sealably secured at its upper end to the sleeve 9 and housing 25.

The lower end of sleeve 29 slidingly fits within the upper end of a closure ring 32 having sealing engagement through the O-ring 33 with the inner wall of housing 25. The lower end of sheath 31 is likewise sealably attached to the ring 32 whereby such sheath forms a flexible wall for the chamber 30.

The ring 32 has a vertical passageway 35 above each leg 3 of the bit 1, and each such passageway is counterbored at 36 to slidably but sealably receive the upper end of a tubular bushing 37 having its lower end extending into a counterbore 38 in bore 39 in bit leg 3. Passageway 35 communicates with the indicated passageway through bushing 37 and the latter communicates with bore 39, the last named communicating with a cut away portion 40 of the pin 16, the pin being further contoured or drilled to provide fluid pasageways to selected points within the bearing. The housing 25 has one or more ports 41 above the upper end of the sleeve 29 so that the inner wall of the sheath 31 and the outer surface of the seal 21 are subjected to a common pressure exerted by the ambient.

The features of construction just described enable ebb and flow of lubricant throughout the bearing, and to and from the chamber 30, upon any movement of the cutter 7 relative to the shaft 4 giving rise to a volumetric change within the bearing.

In order to explain the operation of the invention, it is pointed out that earth boring bits are subjected to extreme stresses. Heavy static loads are applied, and these are augmented by impact stresses of high amplitude. As previously explained, lubricating problems are further complicated by the presence of abrasive fluids about the bit.

The extreme stress conditions and the varying directions of resultant forces cause a complex movement of the cutter 7 relative to the shaft 4, and such movement is amplified as wear takes place. One component of movement is axially of the shaft, there may be eccentric movement relative to the axis of the shaft and at the same time the cutter wobbles relative to the shaft 4. Resultant movements cause volumetric changes within the bearing, and such changes may take place at a very high rate both as to sequence and rate of change.

The sheath 31 possesses little inertia and is highly flexible. Hence negligible differential pressures may arise across the seal ring 21 tending to cause leakage of lubricant past the seal ring or ingress of contaminating fluid from outside the seal ring.

To assemble the embodiment above described, the housing 25 together with ring 32 may be placed in inverted position upon a flat surface, and the chamber 30 filled with lubricant. Bushings 37 are then positioned within the counterbores 36, and the bit 1 is placed thereon in inverted position so that the other ends of the bushings enter counterbores 38 whereby the chamber 30 communciates through passageways 39 with the respective cutter bearings. It thus seems apparent that adequate lubrication of the bearings is assured and contamination of the lubricant is avoided.

Broadly the invention comprehends a bearing lubrication system which is so constructed and arranged that adequate uncontaminated lubricant is maintained in a bearing at all times.

The invention claimed is:

1. A bearing assembly comprising, a generally cylindrical body member and a second member rotatably mounted thereon, a bearing between said members, a seal between said members, an annular enclosure in said body member, a cylindrical sheath of impervious, flexible material extending longitudinally within said enclosure and sealably engaging the inner and outer walls of the enclosure thereby forming a lubricant chamber between said sheath and a sidewall of the enclosure, a passageway between said lubricant chamber and the bearing between said members, and means forming a vent between the exterior of said body member and the exterior wall of said sheath so that the sheath and the exterior of said seal are subjected to a common pressure.

2. A bearing assembly comprising, a generally cylindrical body member and a second member rotatably mounted thereon, a bearing between said members, a seal between said members, an annular enclosure in said body member, a cylindrical sheath of impervious, flexible material extending longitudinally within said enclosure and sealably engaging the inner and outer walls of the enclosure thereby forming a lubricant chamber between said sheath and a sidewall of the enclosure, a perforated sleeve in said enclosure and forming a wall opposite said lubricant chamber, a passageway between said lubricant chamber and the bearing between said members, and means forming a vent between the exterior of said body member and the exterior of said sleeve and sheath so that the sheath and the exterior of said seal are subjected to a common pressure.

3. An earth boring drill comprising a bit head having a plurality of downwardly extending legs with inwardly and downwardly extending shafts thereon, conical rolling cutters mounted on said shafts, a bearing between each of said shafts and its associated cutter, a seal between the base of each cutter and the leg at the outer end of the associated shaft, an annular enclosure in said bit head, a cylindrical sheath of impervious flexible material extending longitudinally within said enclosure and sealably engaging the inner and outer walls of the enclosure thereby forming a lubricant chamber between said sheath and a sidewall of the enclosure, a passageway between said lubricant chamber and the bearing between said members, and means forming a vent between the exterior of said bit head and the exterior of said sheath whereby a common pressure is exerted upon the opposite sides of said seal.

4. An earth boring drill comprising a bit head having a plurality of downwardly extending legs with inwardly and downwardly extending shafts thereon, conical rolling cutters mounted on said shafts, a bearing between each of said shafts and its associated cutter, a seal between the base of each cutter and the leg at the outer end of the associated shaft, an annular enclosure in said bit head, a cylindrical sheath of impervious flexible material extending longitudinally within said enclosure and sealably engaging the inner and outer walls of the enclosure thereby forming a lubricant chamber between said sheath and a sidewall of the enclosure, a passageway between said lubricant chamber and the bearing between said members, and means forming a vent between the exterior of said bit head and the exterior of said sheath wereby a common pressure is exerted upon the opposite sides of said seal, said last mentioned means including a foraminated support for the exterior of said sheath.

5. An earth boring drill comprising a bit head having a plurality of downwardly extending legs with inwardly and downwardly extending shafts thereon, conical rolling cutters mounted on said shafts, a bearing between each of of said shafts and its associated cutter, a seal between the base of each cutter and the leg at the outer end of the associated shaft, an enclosure in said bit head, a sheath of impervious, flexible material extending longitudinally within said enclosure and sealably engaging the walls thereof and thereby forming a lubricant chamber between said sheath and a sidewall of the enclosure, a passageway between said lubricant chamber and the bearing between said members, and means forming a vent between the exterior of said bit head and the exterior of said sheath whereby a common pressure is exerted upon the opposite sides of said seal.

References Cited in the file of this patent

UNITED STATES PATENTS

| 1,909,128 | Scott et al. | May 16, 1933 |
| 2,676,073 | Boden | Apr. 20, 1954 |

FOREIGN PATENTS

| 855,654 | France | Feb. 19, 1940 |